United States Patent
Noll et al.

(10) Patent No.: US 9,811,842 B2
(45) Date of Patent: Nov. 7, 2017

(54) SYSTEM AND METHOD FOR SENDING ADVERTISING DATA

(75) Inventors: Roland Noll, San Antonio, TX (US); Mary Catherine McCarthy, San Antonio, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 2479 days.

(21) Appl. No.: 11/863,015

(22) Filed: Sep. 27, 2007

(65) Prior Publication Data

US 2009/0089158 A1    Apr. 2, 2009

(51) Int. Cl.
G06Q 30/00 (2012.01)
H04N 7/16 (2011.01)
G06Q 30/02 (2012.01)

(52) U.S. Cl.
CPC ......... *G06Q 30/0254* (2013.01); *G06Q 30/02* (2013.01)

(58) Field of Classification Search
CPC ....... G06Q 30/02; H04N 21/812; H04H 60/43
USPC ...................... 705/14, 58, 14.71; 725/10–30
See application file for complete search history.

(56) References Cited

U.S. PATENT DOCUMENTS

| | | | |
|---|---|---|---|
| 5,983,200 A * | 11/1999 | Slotznick | 705/26.43 |
| 6,587,835 B1 * | 7/2003 | Treyz et al. | 705/14.64 |
| 6,909,837 B1 | 6/2005 | Unger | |
| 7,206,754 B1 | 4/2007 | Spector | |
| 7,212,988 B1 | 5/2007 | Feldten | |
| 2001/0047294 A1 | 11/2001 | Rothschild | |
| 2002/0032904 A1 | 3/2002 | Lerner | |
| 2002/0069407 A1 | 6/2002 | Fagnani | |
| 2002/0087969 A1 | 7/2002 | Brunheroto | |
| 2003/0083937 A1 | 5/2003 | Hasegawa | |
| 2004/0073915 A1 | 4/2004 | Dureau | |
| 2004/0107137 A1 | 6/2004 | Skinner | |
| 2004/0117254 A1 | 6/2004 | Nemirofsky | |
| 2004/0158528 A1 | 8/2004 | Zuili | |
| 2005/0080665 A1 | 4/2005 | Bowman-Amuah | |
| 2005/0278731 A1 | 12/2005 | Cameron | |
| 2006/0004632 A1 | 1/2006 | Kelsen | |
| 2006/0026629 A1 | 2/2006 | Harris | |
| 2006/0080239 A1 | 4/2006 | Harlog | |
| 2006/0195866 A1 | 8/2006 | Thukral | |
| 2006/0253323 A1 | 11/2006 | Phan | |
| 2006/0256133 A1 | 11/2006 | Rosenberg | |
| 2007/0074258 A1 | 3/2007 | Wood et al. | |

(Continued)

FOREIGN PATENT DOCUMENTS

EP    1 339 229 A2    8/2003
WO    2005/125190    6/2005

*Primary Examiner* — Sun Li
(74) *Attorney, Agent, or Firm* — Guntin & Gust, PLC; Ralph Trementozzi (57) ABSTRACT

A computer readable medium is disclosed containing a computer program useful for performing a method for sending advertising data, the computer program comprising instructions to send a video data stream comprising advertising data from an IPTV server to a first end user device, instructions to receive at the IPTV server selection data from the first end user device selecting the advertising data and a second end user device and instructions to send from the IPTV server a data associated with the advertising data to the second end user device. A system is disclosed for performing the method. A data structure is disclosed for use by the system and method.

20 Claims, 4 Drawing Sheets

(56) References Cited

U.S. PATENT DOCUMENTS

| | | |
|---|---|---|
| 2007/0078706 A1 | 4/2007 | Datta et al. |
| 2007/0157228 A1 | 7/2007 | Bayer |
| 2007/0157259 A1* | 7/2007 | Koplar et al. ............... 725/81 |
| 2007/0250901 A1* | 10/2007 | McIntire et al. ............ 725/146 |
| 2011/0093879 A1* | 4/2011 | Salkind et al. .............. 725/23 |

* cited by examiner

SYSTEM AND METHOD FOR SENDING ADVERTISING DATA

FIELD OF THE DISCLOSURE

The present disclosure relates to the field of sending advertising data.

BACKGROUND OF THE DISCLOSURE

Targeted advertisements have historically been mailed to large targeted geographic areas such as a particular city, so that regional advertisers reach only persons who are deemed by the advertiser as most likely to be responsive to their advertisements. Advertisements are a component in digital video services, including live or pre-recorded broadcast television TV, special or pay-per-view programming, video on demand (VOD), and other content data choices available to subscribers.

DETAILED DESCRIPTION

In an illustrative embodiment, while watching a television advertisement on a first end user device, an end user can request that the television advertising data be sent to a second end user device. The second end user device can be a mobile device such as a mobile device associated with the end user. The end user can also request that advertising data be sent to an end user device associated with another end user. The second end user device can also be a stationary device such as a home personal computer. Thus, the end user can watch the advertising on a mobile device such as a cell phone or a stationary personal computer.

The second end user device can also receive data associated with advertising data (also referred to herein as "associated data") other than television advertisement as seen on television. The associated data can also contain product information or a product coupon. The associated data can also contain merchant location data indicating a location for a merchant who sells the product. The associated data can also contain product availability data for the merchant location indicating whether the product is available or in stock at the merchant location. The advertising data can also contain merchant location data so that an end user can be alerted on an end user device when the end user device is entering a zone of interest (a specified radial distance, for example 2 kilometers) surrounding a merchant location having the product available or "in stock". The alert can be data message containing an audio announcement rendered audibly on the end user device announcing that the end user device is within the zone of interest for a merchant location having the product in stock.

The advertising data can be sent to an end user device such as a cell phone. Additionally, the targeting data used to send the advertising data to the end user TV subscriber can also be linked to the end user at the mobile device, such as a cell phone when the advertising data is transferred to the end user device associated with the same end user.

In another embodiment, a computer readable medium is disclosed containing a computer program useful for performing a method for sending advertising data, the computer program comprising instructions to send a video data stream comprising video and advertising data from an IPTV server to a first end user device; instructions to receive at the IPTV server, selection data from the first end user device selecting the advertising data and a second end user device; and instructions to send from the IPTV server, data associated with the advertising data (associated data) to the second end user device.

In another embodiment of the medium the associated data further comprise a data item selected from the group consisting of video advertising data, availability data for a product associated with the advertising data indicating that a merchant location has the product in stock, merchant location data for the merchant having the product in stock indicating a physical location for the merchant location, coupon data for a coupon for the product and zone of interest data indicating a radial distance from the merchant having the product in stock. In another embodiment of the medium, the computer program further comprises instructions to send from a local server closest to the second end user device audio message data to the second end user device for rendering an audible message announcing that the second end user device has entered a zone of interest for a merchant location when the availability data indicate that the merchant location has the product in stock.

In another embodiment of the medium, the audio message data comprise an announcement of at least one data item selected from the group consisting of product name data, merchant name data, merchant location data and directions data to a merchant location from a current location for the second end user device. In another embodiment of the medium the IPTV server receives the icon data representing the advertising data from the second end user device and sends the advertising data associated with the icon to the second end user device. In another embodiment of the medium the first end user device is associated with a first end user and the second end user device is associated with a second end user. In another embodiment of the medium the second end user device is automatically selected based on an end user selection to find the second end user device in closest proximity to a merchant location having the product available.

In another embodiment of the medium the computer program further comprises instructions to send from the local server closest to the second end user device, merchant layout data to the second end user device identifying an aisle configuration for the merchant location and an isle location in the isle configuration indicating where in the isle configuration the product is located. In another embodiment of the medium the second end user device is selected by selecting one of a plurality of icons presented on a first end user device display wherein each of the plurality of icons is associated with one of a plurality of end user devices. In another embodiment of the medium the computer program further comprises instructions to receive at the local server a purchase order selection for the product from the second end user device for the product and instructions to send from the local server purchase order data for the product to the merchant location. In another embodiment, all data sent to the second end user device from the local server closest to the second end user device, can also be sent to the second end user device from a local server closest to the first end user device.

In another embodiment, a system is disclosed for performing a method for sending advertising data, the system comprising a processor in data communication with a computer readable medium and a computer program embedded in the computer readable medium, the computer program comprising instructions to send a video data stream comprising video and advertising data from an IPTV server to a first end user device, instructions to receive at the IPTV server selection data from the first end user device selecting the advertising data and a second end user device and instructions to send from the IPTV server data associated with the advertising data to the second end user device.

In another embodiment of the system the associated data further comprises a data item selected from the group consisting of video advertising data, availability data for a product associated with the advertising data indicating that a merchant location has the product in stock, merchant location data for the merchant having the product in stock indicating a physical location for the merchant location, coupon data for a coupon for the product and zone of interest data indicating a radial distance from the merchant having the product in stock. In another embodiment of the system, the computer program further comprises instructions to send from a local server closest to the second end user device, audio message data to the second end user device for rendering an audible message announcing that the second end user device has entered a zone of interest for a merchant location when the availability data indicate that the merchant location has the product in stock.

In another embodiment of the system the audio message data comprises an announcement of at least one data item selected from the group consisting of a product name data, merchant name data, merchant location data and directions data to a merchant location from a current location for the second end user device. In another embodiment, a computer readable medium is disclose containing computer program instructions that when executed by a computer perform a method for receiving advertising data, the computer program further comprising instructions to receive at an end use device, audio message data for rendering an audible message at the end user device announcing that the second end user device has entered a zone of interest for a merchant location when availability data indicate that the merchant location has the product in stock.

In another embodiment the of the medium, the computer program further comprises instructions to receive merchant layout data from the local server closest to the end user device identifying an aisle configuration for the merchant location and an isle location in the isle configuration indicating where in the isle configuration the product is located. In another embodiment of the medium, the computer program further comprises instructions to send a purchase order selection for the product to the merchant location. In another embodiment, a system for receiving advertising data is disclosed, the system comprising a processor in data communication with a computer readable medium and a computer program embedded in the computer readable medium, the computer program further comprising instructions to receive at an end user device, audio message data for rendering an audible message at the end user device announcing that the second end user device has entered a zone of interest for a merchant location when the availability data indicate that the merchant location has the product in stock.

In another embodiment the of the medium, the computer program further comprise instructions to receive merchant layout data identifying an aisle configuration for the merchant location and an isle location in the isle configuration indicating where in the isle configuration the product is located. In another embodiment of the medium, the computer program further comprises instructions to send a purchase order selection for the product to the merchant location. In another embodiment a data structure embedded in a computer readable medium is disclosed, the data structure comprising a first data structure field for containing data indicative of a zone of interest for a merchant location having a product in stock for identifying when an end user device is within a radial distance from the merchant location. In another embodiment of the data structure, the data structure further comprises a second data structure field for containing data indicative of an audio message for announcing a product name and merchant location for the product.

In another embodiment, the advertising data is transferred to the end user device associated with a different end user. The advertising data can include but is not limited to the television advertisement as seen on television and reformatted to the second end user device, a mini video, product information data, product coupon data or another data item sent to another end user device. When a user sees an interesting advertisement or product placement on something interesting while watching a football game television, they can have advertising data sent to cell phone (for example: an end user sees a television advertisement for new athletic tennis shoes). The end user does not have to run right out and miss the football game, they continue watching and later, while shopping they have the shoe advertising data and product information in their mobile end user device. The advertising data may include extended information from the advertising data such as which pair of tennis shoes a famous athlete wears and what sizes are available at the local merchant location.

Figure 1:
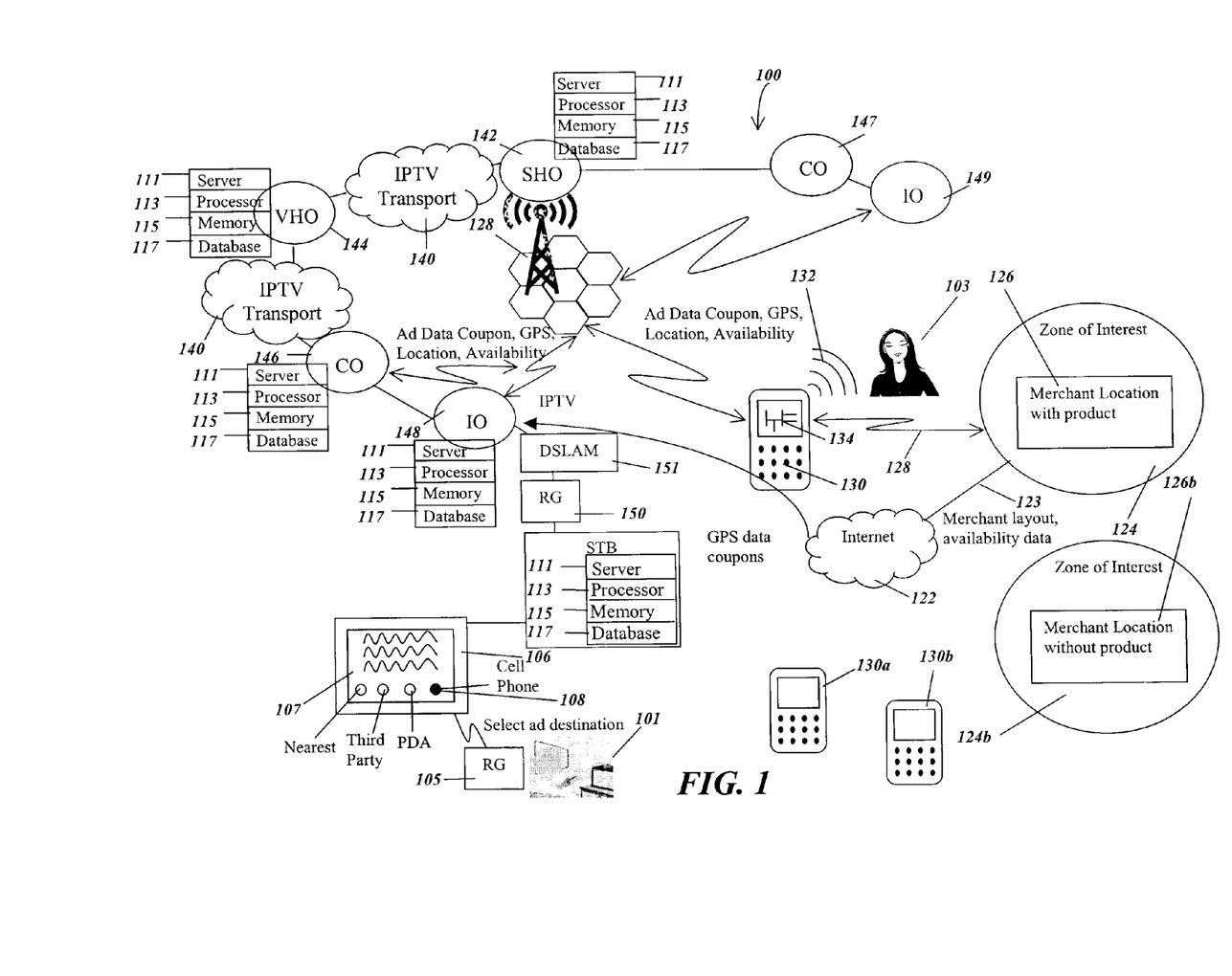
FIG. 1 depicts an illustrative embodiment of a system for sending advertising data.

Turning now to FIG. 1, in another illustrative embodiment, an IPTV system server 104 sends a video data stream 102 comprising television programming content data and advertising data to a first end-user device set top box 109. The set top box 109 includes a processor 111, memory 113, database 115 and network interface 117. The set top box 109 transfers the video and advertising data to a first end user device display, which in the present example is a television 106. The advertising data includes but is not limited to television video advertising data, a product associated with advertising data, availability data indicating whether a product is available at a particular merchant location, merchant location data for the product, a zone of interest for a merchant location, icon data for selecting destination end user devices for receiving advertising data from a first end user device and icon data for referencing advertising data. In another embodiment, the advertising data is queued in memory at the set top box and resent to the IPTV system for transfer to a second end user device. In another embodiment, the advertising data is queued in memory at an IPTV server and resent to the IPTV system for transfer to a second end user device.

In another embodiment, IPTV channels of video data are first broadcast as video data comprising video content and advertising data in an internet protocol (IP) from a server at a super hub office (SHO) 142 to a regional or local IPTV video hub office (VHO) server 144, to a central office (CO)

server 146 or 147 to an intermediate office (IO) 148 or 149 server. Targeted advertising data can also be inserted into the video data stream at the VHO, CO or IO. The VHO is referred to herein as a regional server. The CO and IO are referred to herein as local servers. The IPTV system includes a hierarchically arranged network of servers wherein the SHO transmits video and advertising data to a video hub office (VHO) end server location close to a subscriber or end user device, such as a CO 146 or IO 148 server 111. The IPTV servers are interconnected via IPTV transport 140 which also provide data communication for Internet and voice over Internet protocol (VoIP) data services to subscribers.

The IPTV channels are sent in an Internet protocol (IP) data multicast group to access nodes such as digital subscriber line access multiplexer (DSLAM) 151 and gateway 150. In another embodiment the gateway 150 is a residential gateway (RG). A video data multicast or unicast for a particular IPTV channel is joined by the set-top boxes (STBs) at IPTV subscriber homes from the DSLAM 151. Each SHO, VHO, CO, IO and STB includes a server 111, processor 113, a memory 115 and a database 117. The IO server delivers IPTV, Internet and VoIP data and content. The television content is delivered via multicast and television advertising data via unicast or multicast depending on a target television advertising group of end user client subscriber devices to which the advertising data is directed. In another particular embodiment, end user devices include, but are not limited to, wire line phones, portable phones, lap top computers, personal computers (PC), cell phones, mobile MP3 players communicate with the communication system, i.e., an IPTV network through residential gateway (RG) 150 and high speed communication lines which are shown for an example as IPTV transport 140.

In another illustrative embodiment, a first end-user 101 views television data 107 on a first end user device 106 which in the current example is a television 106. A set of icons 108 representing a set of potential destination end user devices are displayed under the television data 107. A first end user 101 uses remote control (RC) 105 to select one of the icons 108 to indicate a destination end user device, that is, a second end user device. The icons 108 represent destination end user devices to which advertising data can be transferred via a selection by the first end-user device 106 via the IPTV system 120.

The icons 108 may be associated with any end user device associated with the first end user or a second end user 103. End user device data identifying end user devices are stored in the IPTV server data base and icon data representing the end user devices are sent to the set top box for display 108. End user device data identifying end user devices are stored in the IPTV server data base and icon data representing the end user devices are sent to the set top box for display 108. Thus, in another embodiment a first end user device is provided with a list of other end users and associated end user devices represented by icons to which advertising data can be sent. The other end user devices may be associated with third party end users, that is, end users other than the end user forwarding or requesting the ITPV system to send the advertising data. In another embodiment, the end user devices include but are not limited to personal data assistants, cell phones, web tablets, portable personal computers, portable lap top computers and portable MPEG-3 (MP3) players.

In another embodiment, as a second and user device approaches a merchant location, and enters a zone of interest or radial distance from the merchant location, an audio message is sent to the second end user device. The audio message can be but is not limited to a text message submitted to a text to speech processor for announcement, a multi-media message contain audio, a Voice over Internet protocol (VoIP) message, or an IP data packet message containing the audio data. The second end user device receives the audio message plays it back (aurally renders) over a speaker or other sound rendering device so that the audio message is announced 132 to the second end user 103 over the second end user device 130. In another embodiment, the video and advertising data are delivered over a digital television system. In another embodiment, the video and advertising data are delivered over an analog television system.

Once selected by a first end user, the advertising data is transferred via the IPTV system 120 in a second end-user device 130. In another embodiment, a first end user can use the remote control to select an item, such as a jacket worn by an actor on television and advertising data associated with the jacket is transferred to a selected second end user device as indicated by icon 108. The advertising data is presented on end user display 134. In another embodiment of the IPTV network 120 utilizes a secondary system data delivery such as a cellular telephone network 128 to transfer the advertising data to a mobile device such as a cell phone 130. In another illustrative embodiment, a merchant location sends merchant lay out data, availability data and global positioning system location data to the IPTV network 120 via Internet 122. The IPTV system then sends the merchant lay out data, availability data and global positioning system location data to the second end user device. The merchant layout data 123 can include but is not limited to the aisle configuration of the merchant location and the aisle location within the aisle configuration of the merchant location. In another embodiment, the icons 108 can be used to select a third party end user device, a particular second end user device associated with a first end user or a nearest second end user device to automatically select a second end user device that is in closest proximity to a merchant location having the product in stock. The nearest second end user is determined by comparing end user GPS locations to a merchant location having the product in stock. As shown in FIG. 1, end user device 130 is closest to a merchant location 126 having the product in stock. An audio message can be sent from a local server (IO 149 or CO 147) closest to the second end user device 130. End user devices 130*a* and 130*b* are closest merchant location 126*b* not having the product in stock.

Figure 2:
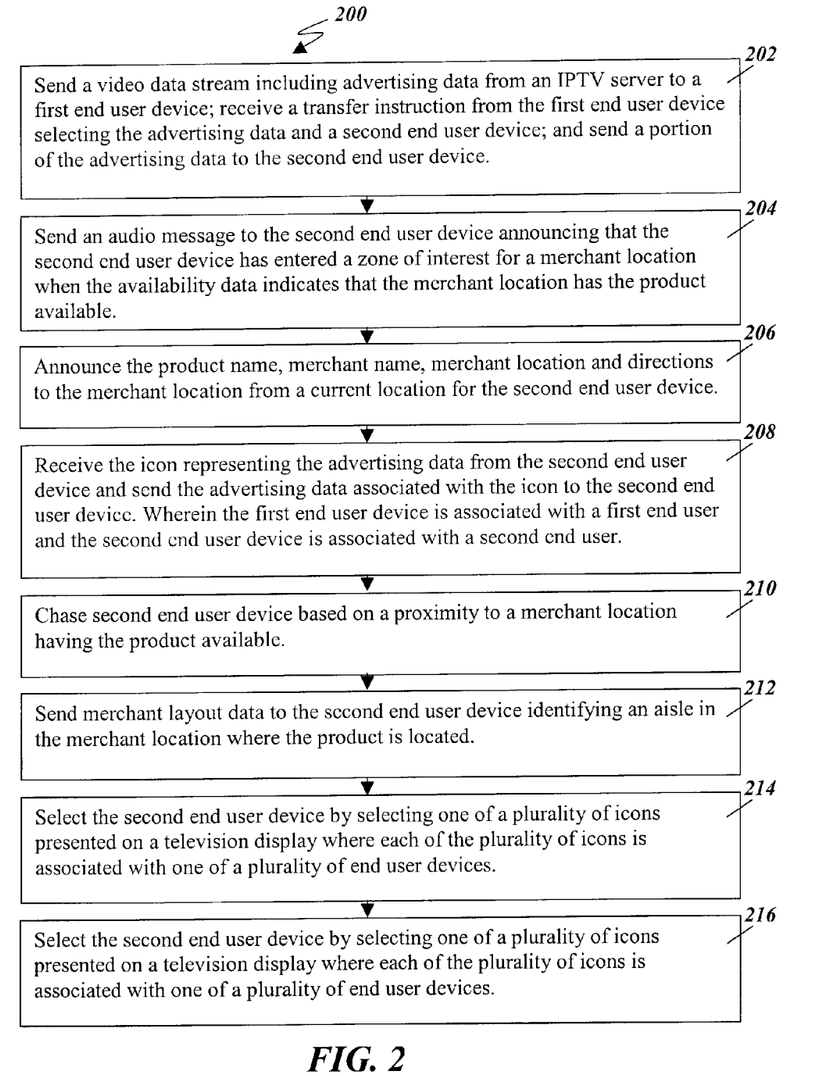
FIG. 2 depicts a flow chart of functions performed in an illustrative method for sending advertising data.

Turning now to FIG. 2, a flow chart 200 of functions performed in another embodiment is illustrated. The order of the blocks in the flow chart is not meant to limit the order in which any block may be executed. The blocks may also be executed individually and any block may be included or left out in an embodiment. As shown in block 202, another embodiment sends a video data stream including but not limited to advertising data from an IPTV server to a first end user device, receives a transfer instruction from the first end user device selecting the advertising data and a second end user device and sends a portion of the advertising data to the second end user device. In block 204 another embodiment then sends an audio message to the second end user device announcing that the second end user device has entered a zone of interest for a merchant location when the availability data indicates that the merchant location has the product available. In block 206 another embodiment then announces the product name, merchant name, merchant location and directions to the merchant location from a current location for the second end user device.

In block 208 another embodiment a local IPTV server then receives the icon data representing the advertising data from the second end user device and sends the advertising data associated with the icon to the second end user device. The first end user device is associated with a first end user and the second end user device is associated with a second end user. In block 210 another embodiment then selects a second end user device based on proximity of the second end user device to a merchant location having the product available. In block 212 another embodiment then sends merchant layout data to the second end user device identifying an aisle in the merchant physical location where the product is located. In block 214 another embodiment then selects the second end user device by selecting one of a plurality of icons presented on a television display where in each of the plurality of icons is associated with one of a plurality of end user devices. At block 216 another embodiment then selects the second end user device by selecting one of a plurality of icons presented on a television display where each of the plurality of icons is associated with one of a plurality of end user devices.

Figure 3:
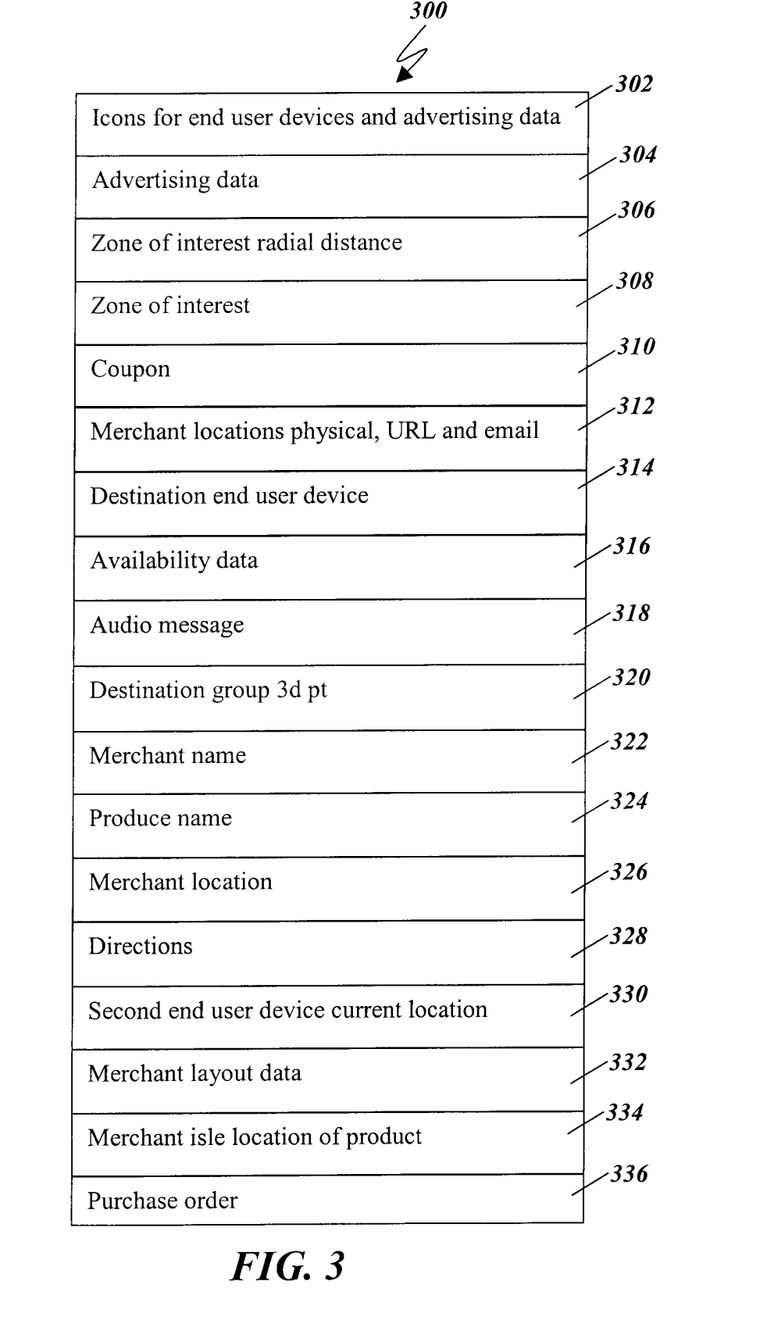
FIG. 3 depicts a data structure embedded in a computer readable medium that is used by a processor and method for sending advertising data in another illustrative embodiment.

Turning now to FIG. 3, in another embodiment a data structure 300 is provided as in FIG. 3 shown. The data structure 300 is embedded in a computer readable medium. As shown in FIG. 3, in an illustrative embodiment, the data structure can include but is not limited to a first data structure field 302 as shown for containing data indicative of icons for end use devices and advertising data. In another illustrative embodiment, the data structure further includes but is not limited to a second data structure field 304 is shown for containing advertising data as described herein. In another illustrative embodiment, the data structure further includes but is not limited to a third data structure filed 306 as shown for containing data indicative of a zone interest radial distance or zone of interest around a merchant having a product in stock. In another illustrative embodiment, the data structure further includes but is not limited to a fourth data structure field 308 as shown for containing data indicative of a zone of interest formed by the radial distance surrounding the merchant having the product in stock. In another illustrative embodiment, the data structure can include but is not limited to a fifth data structure field 310 as shown for containing data indicative of a product coupon.

In another illustrative embodiment, the data structure further includes but is not limited to a sixth data structure field 312 as shown containing data indicative of a merchant's physical location in GPS coordinate and physical address, and a uniform resource locator (URL) for linking an end user device to the merchant's web site and the merchant's email address. In another illustrative embodiment, the data structure further includes but is not limited to a seventh data structure field 314 as shown containing data indicative of a destination end user device. The second end user device receiving the advertising data is a destination end user device. In another illustrative embodiment, the data structure further includes but is not limited to an eighth data structure field 316 as shown containing data indicative of product availability data for the merchant. In another illustrative embodiment, the data structure further includes but is not limited to a ninth data structure field 318 as shown containing data indicative of an audio message.

In an illustrative embodiment, the data structure further includes but is not limited to an tenth data structure field 320 as shown containing data indicative of third party end users and end user devices. In another illustrative embodiment, the data structure further includes but is not limited to an eleventh data structure field 322 as shown containing data indicative of a merchant name having a product for sale associated with the advertising data. In another illustrative embodiment, the data structure further includes but is not limited to a twelfth data structure field 324 as shown containing data indicative of a product name associated with the advertising data. In an illustrative embodiment, the data structure further includes but is not limited to a thirteenth data structure field 326 as shown containing data indicative of the merchant location having the product for sale.

In another illustrative embodiment, the data structure further includes but is not limited to a fourteenth data structure field 328 as shown containing data indicative of directions from a current location of the second end user device 330 to the merchant location having the product for sale. In another illustrative embodiment, the data structure further includes but is not limited to a fifteenth data structure field 330 as shown containing data indicative of the second end user device current location. In another illustrative embodiment, the data structure further includes but is not limited to a sixteenth data structure field 332 as shown containing data indicative of lay out data but not limited to the isle configuration for the merchant location having the product for sale. In an illustrative embodiment, the data structure can include but is not limited to a seventeenth data structure field 334 as shown containing data indicative an isle location within the isle configuration 332 of the merchant location having the product for sale. In another illustrative embodiment, the data structure further includes but is not limited to an eighteenth data structure field 336 as shown containing data indicative of a purchase order for the product at the merchant location having the product for sale. The purchase order includes encrypted eCommerce data including but not limited to an encrypted credit card number, name of purchaser, address and product purchase quantity.

Figure 4:
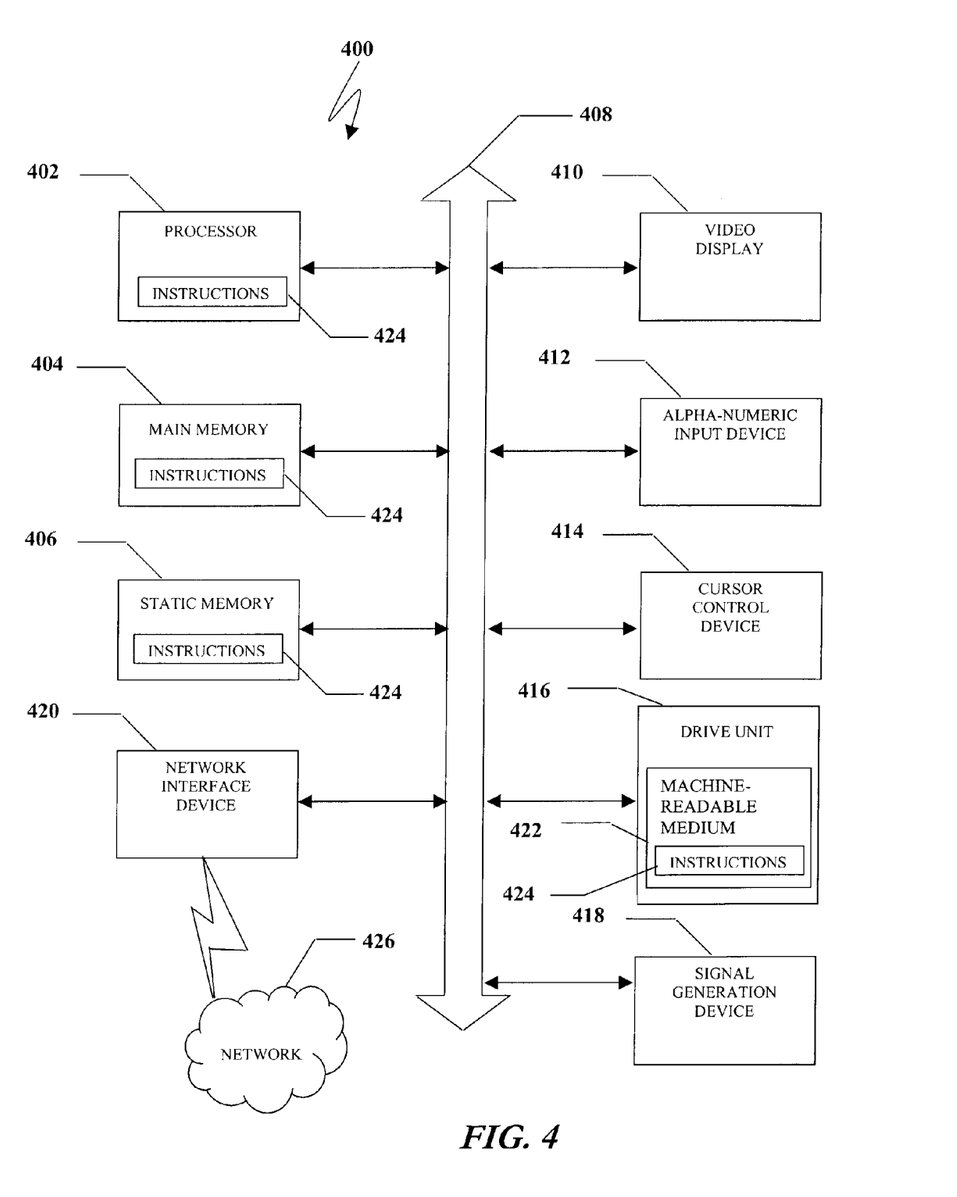
FIG. 4 is an illustrative embodiment of a machine for performing functions disclosed in another illustrative embodiment.

FIG. 4 is a diagrammatic representation of a machine in the form of a computer system 400 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine.

It will be understood that a device of the present invention includes broadly any electronic device that provides voice, video or data communication. Further, while a single machine is illustrated, the term "machine" shall also be taken to include any collection of machines that individually on jointly execute a set (or multiple sets) of instructions to perform any one or more of the methodologies discussed herein. The computer system 400 may include a processor 402 (e.g., a central processing unit (CPU), a graphics processing unit (GPU), or both), a main memory 404 and a static memory 406, which communicate with each other via a bus 408. The computer system 400 may further include a video display unit 410 (e.g., liquid crystals display (LCD), a flat panel, a solid state display, or a cathode ray tube (CRT)). The computer system 400 may include an input device 412 (e.g., a keyboard), a cursor control device 414 (e.g., a mouse), a disk drive unit 416, a signal generation device 418 (e.g., a speaker or remote control) and a network interface.

The disk drive unit 416 may include a machine-readable medium 422 on which is stored one or more sets of instructions (e.g., software 424) embodying any one or more of the methodologies or functions described herein, including those methods illustrated in herein above. The instructions 424 may also reside, completely or at least partially, within the main memory 404, the static memory 406, and/or within the processor 402 during execution thereof by the computer system 400. The main memory 404 and the processor 402 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but not limited to, distributed processing or component/object distributed processing, parallel processing, or virtual machine processing can also be constructed to implement the methods described herein. The present invention contemplates a machine readable medium containing instructions 424, or that which receives and executes instructions 424 from a device connected to a network environment 426 can send or receive voice, video or data, and to communicate over the network 426 using the instructions 424. The instructions 424 may further be transmitted or received over a network 426 via the network interface device 420. The machine readable medium may also contain a data structure for containing data useful in providing a functional relationship between the data and a machine or computer in an illustrative embodiment of the disclosed system and method.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the invention is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory machine-readable storage medium comprising executable instructions that, when executed by a television server including a processor, facilitate performance of operations comprising:

sending to a set-top box, from the television server, a video data stream, wherein the video data stream comprises item data representing an item worn by an actor in the video data stream;

sending to the set-top box, from the television server, icon data, wherein the icon data is in the video data stream and wherein the icon data comprises a plurality of icons, each of which is associated with one of a plurality of mobile devices;

receiving at the television server, from the set-top box, selected icon data and selected item data, wherein the selected icon data indicates a selected one of the plurality of mobile devices and the selected item data indicates, as a selected item, the item worn by the actor in the video data stream;

interfacing by the television server with a cellular telephone system; and sending via the cellular telephone system, from the television server, to the selected one of the plurality of mobile devices, advertising data for the selected item, wherein the advertising data is sent when the selected one of the plurality of mobile devices comes in proximity with a merchant having the selected item in stock, wherein the selected one of the plurality of mobile devices is automatically selected based on a set-top box end user selection of a particular icon, presented on a display, of the icon data to find one of the plurality of mobile devices that is in closest proximity to a merchant location having the selected item available.

2. The medium of claim 1, wherein the advertising data further comprises a data item selected from a group comprising video advertising data, availability data for the selected item indicating that the merchant location has the selected item in stock, merchant location data for the merchant having the selected item in stock indicating a physical location for the merchant location, coupon data for a coupon for the selected item and zone of interest data indicating a radial distance from the merchant having the selected item in stock.

3. The medium of claim 2, wherein the operations further comprise:

locating the selected one of the plurality of mobile devices; and sending audio message data from the television server to the selected one of the plurality of mobile devices, wherein the audio message data is for rendering an audible message announcing that the selected one of the plurality of mobile devices has entered a zone of interest for the merchant location when the availability data indicates that the merchant location has the selected item in stock.

4. The medium of claim 3, wherein the audio message data comprises merchant name data, merchant location data and directions data to the merchant location from a current location for the selected one of the plurality of mobile devices.

5. The medium of claim 3, wherein the operations further comprise:

sending merchant layout data, from the television server, to the selected one of the plurality of mobile devices, wherein the merchant layout data identifies an aisle configuration for the merchant location and an aisle location in the aisle configuration indicating where in the aisle configuration the selected item is located.

6. The medium of claim 3, wherein the operations further comprise:

receiving, at the television server, a purchase order selection for the selected item, wherein the purchase order selection is from the selected one of the plurality of mobile devices; and sending purchase order data for the selected item to the merchant location.

7. The medium of claim 2, wherein the television server receives the advertising data from the set-top box.

8. The medium of claim 2, wherein the set-top box is associated with a first end user and the selected one of the plurality of mobile devices is associated with a second end user.

9. The medium of claim 1, wherein the set-top box is in operative communication with a television, wherein the video data stream is provided by the set-top box to the television and wherein the icon data is presented on the television as a plurality of icons.

10. The medium of claim 9, wherein the selected icon data corresponds to one of the plurality of icons that had been selected by a remote control in operative communication with the television.

11. A system comprising:

a television server including a processor; and a memory that stores executable instructions that, when executed by the processor, facilitate performance of operations comprising:

sending to a set-top box, from the television server, a video data stream, wherein the video data stream comprises item data representing an item worn by an actor in the video data stream;

sending to the set-top box, from the television server, icon data, wherein the icon data is in the video data stream and wherein the icon data comprises a plurality of icons, each of which is associated with one of a plurality of mobile devices;

receiving at the television server, from the set-top box, selected icon data and selected item data, wherein the selected icon data indicates a selected one of the plurality of mobile devices and the selected item data indicates, as a selected item, the item worn by the actor in the video data stream;

interfacing by the television server with a cellular telephone system; and sending via the cellular telephone system, from the television server, to the selected one of the plurality of mobile devices, advertising data for the selected item, wherein the advertising data is sent when the selected one of the plurality of mobile devices comes in proximity with a merchant having the selected item in stock, wherein the selected one of the plurality of mobile devices is automatically selected based on a set-top box end user selection of a particular icon, presented on a display, of the icon data to find one of the plurality of mobile devices that is in closest proximity to a merchant location having the selected item.

12. The system of claim 11, wherein the advertising data further comprises a data item selected from a group comprising video advertising data, availability data for the selected item indicating that the merchant location has the selected item in stock, merchant location data for the merchant having the selected item in stock indicating a physical location for the merchant location, coupon data for a coupon for the selected item and zone of interest data indicating a radial distance from the merchant having the selected item in stock.

13. The system of claim 12, wherein the operations further comprise:
sending audio message data from the television server to the selected one of the plurality of mobile devices, wherein the audio message data is for rendering an audible message announcing that the selected one of the plurality of mobile devices has entered a zone of interest for the merchant location when the availability data indicates that the merchant location has the selected item in stock.

14. The system of claim 13, wherein the audio message data comprises an announcement of at least one data item selected from a group comprising merchant name data, merchant location data and directions data to the merchant location from a current location for the selected one of the plurality of mobile devices.

15. The system of claim 11, wherein the set-top box is in operative communication with a television, wherein the video data stream is provided by the set-top box to the television and wherein the icon data is presented on the television as a plurality of icons.

16. A method comprising:
sending, by a television server including a processor, to a set-top box a video data stream, wherein the video data stream comprises item data representing an item worn by an actor in the video data stream;
sending to the set-top box, by the television server, icon data, wherein the icon data is in the video data stream and wherein the icon data comprises a plurality of icons, each of which is associated with one of a plurality of mobile devices;
receiving by the television server, from the set-top box, selected icon data and selected item data, wherein the selected icon data indicates a selected one of the plurality of mobile devices and the selected item data indicates, as a selected item, the item worn by the actor in the video data stream;
interfacing by the television server with a cellular telephone system; and
sending via the cellular telephone system, by the television server, to the selected one of the plurality of mobile devices, advertising data for the selected item, wherein the advertising data is sent when the selected one of the plurality of mobile devices comes in proximity with a merchant having the selected item in stock, wherein the selected one of the plurality of mobile devices is automatically selected based on a set-top box end user selection of a particular icon, presented on a display, of the icon data to find one of the plurality of mobile devices that is in closest proximity to a merchant location having the selected item available.

17. The method of claim 16, wherein the advertising data further comprises a data item selected from a group comprising video advertising data, availability data for the selected item indicating that the merchant location has the selected item in stock, merchant location data for the merchant having the selected item in stock indicating a physical location for the merchant location, coupon data for a coupon for the selected item and zone of interest data indicating a radial distance from the merchant having the selected item in stock.

18. The method of claim 17, further comprising:
sending audio message data by the television server to the selected one of the plurality of mobile devices, wherein the audio message data is for rendering an audible message announcing that the selected one of the plurality of mobile devices has entered a zone of interest for the merchant location when the availability data indicates that the merchant location has the selected item in stock.

19. The method of claim 18, wherein the audio message data comprises an announcement of at least one data item selected from a group comprising merchant name data, merchant location data and directions data to the merchant location from a current location for the selected one of the plurality of mobile devices.

20. The method of claim 16, wherein the set-top box is in operative communication with a television, wherein the video data stream is provided by the set-top box to the television and wherein the icon data is presented on the television as a plurality of icons.

* * * * *